(12) United States Patent
Larsen

(10) Patent No.: US 8,504,213 B2
(45) Date of Patent: Aug. 6, 2013

(54) REGULATION OF GENERATING PLANT

(75) Inventor: Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 12/492,176

(22) Filed: Jun. 26, 2009

(65) Prior Publication Data

US 2010/0332045 A1    Dec. 30, 2010

(51) Int. Cl.
G05D 23/19    (2006.01)
G06F 1/28    (2006.01)

(52) U.S. Cl.
USPC .......................................... 700/292; 700/299

(58) Field of Classification Search
USPC ................... 700/22, 286, 287, 292, 295, 297, 700/298, 299, 300; 290/44, 55
See application file for complete search history.

(56) References Cited

U.S. PATENT DOCUMENTS

| | | | | |
|---|---|---|---|---|
| 4,503,673 A * | 3/1985 | Schachle et al. | ................ | 60/398 |
| 4,588,376 A * | 5/1986 | Tyson et al. | ................... | 432/36 |
| 4,940,886 A * | 7/1990 | Kircherer et al. | .......... | 219/451.1 |
| 5,196,830 A * | 3/1993 | Birging et al. | ............... | 340/584 |
| 5,995,350 A * | 11/1999 | Kopelman | .................... | 361/103 |
| 6,222,714 B1 * | 4/2001 | Hoffman | ...................... | 361/93.2 |
| 6,222,716 B1 * | 4/2001 | Chiang et al. | ................. | 361/103 |
| 6,625,520 B1 * | 9/2003 | Chen et al. | .................... | 700/286 |
| 6,701,222 B1 * | 3/2004 | Kerem et al. | ................. | 700/300 |
| 6,714,022 B2 * | 3/2004 | Hoffman | ........................ | 324/547 |
| 6,822,218 B2 * | 11/2004 | Helmig et al. | ............ | 250/227.18 |
| 6,841,764 B2 * | 1/2005 | Fuchs | ............................. | 219/621 |
| 6,842,718 B2 * | 1/2005 | Byrd et al. | ..................... | 702/182 |
| 7,005,992 B2 * | 2/2006 | Kawai et al. | .................. | 340/588 |
| 7,135,988 B2 * | 11/2006 | Kawai et al. | ............. | 340/870.17 |
| 7,149,098 B1 * | 12/2006 | Chen | .......................... | 363/56.09 |
| 7,231,280 B2 * | 6/2007 | Costa | ............................. | 700/286 |
| 7,231,281 B2 * | 6/2007 | Costa | ............................. | 700/286 |
| 7,336,464 B1 * | 2/2008 | Potanin et al. | ................. | 361/103 |
| 7,538,523 B2 * | 5/2009 | Kitamura et al. | ............... | 322/33 |
| 7,640,080 B2 * | 12/2009 | Nakamura et al. | ........... | 700/299 |
| 7,660,649 B1 * | 2/2010 | Hope et al. | .................... | 700/295 |
| 7,808,760 B2 * | 10/2010 | Kopelman | .................... | 361/103 |
| 7,814,346 B2 * | 10/2010 | Diab | ............................. | 713/300 |
| 7,834,472 B2 * | 11/2010 | Rebsdorf et al. | ................ | 290/44 |
| 7,886,985 B2 * | 2/2011 | Moore et al. | ................. | 236/46 C |
| 7,968,828 B2 * | 6/2011 | Haga | ............................. | 219/494 |
| 8,242,918 B2 * | 8/2012 | Brusveen et al. | ............. | 340/595 |
| 2006/0125421 A1 * | 6/2006 | Costa | ............................. | 315/294 |
| 2006/0214428 A1 * | 9/2006 | Altemark et al. | ............... | 290/44 |
| 2007/0006603 A1 * | 1/2007 | Reusche et al. | .............. | 62/196.4 |

(Continued)

FOREIGN PATENT DOCUMENTS

JP    2006345654 A  * 12/2006
JP    2009130944 A  * 6/2009

(Continued)

*Primary Examiner* — Charles Kasenge
(74) *Attorney, Agent, or Firm* — Ernest G. Cusick; Hoffman Warnick LLC

(57) ABSTRACT

A method and system are disclosed that enable the regulation of the temperature of transmission equipment connected to a generating plant. In one embodiment, a method includes obtaining a temperature of transmission equipment connected to a generating plant and regulating the output of the generating plant in response to the temperature exceeding a threshold level to reduce the temperature of the transmission equipment to below the threshold level.

17 Claims, 2 Drawing Sheets

U.S. PATENT DOCUMENTS

| | | |
|---|---|---|
| 2007/0014066 A1 * | 1/2007 | Ye ................................. 361/100 |
| 2007/0073445 A1 * | 3/2007 | Llorente Gonzalez et al. ............................ 700/286 |
| 2007/0132607 A1 * | 6/2007 | Nagano ..................... 340/870.17 |
| 2007/0253132 A1 * | 11/2007 | Nakamura et al. ............. 361/103 |
| 2008/0013239 A1 * | 1/2008 | Kopelman .................... 361/103 |
| 2008/0055807 A1 * | 3/2008 | Guillot et al. .................... 361/71 |
| 2008/0106425 A1 * | 5/2008 | Deaver et al. ................. 340/646 |
| 2008/0150282 A1 * | 6/2008 | Rebsdorf et al. ................. 290/44 |
| 2008/0238634 A1 * | 10/2008 | Diab et al. ............... 340/310.11 |
| 2008/0265577 A1 | 10/2008 | Fortmann et al. |
| 2008/0298964 A1 * | 12/2008 | Rimmen ......................... 416/39 |
| 2009/0001725 A1 * | 1/2009 | Llorente Gonzalez et al. . 290/44 |
| 2009/0168274 A1 * | 7/2009 | Doppel et al. ................... 361/18 |
| 2010/0253079 A1 * | 10/2010 | Bolln et al. ...................... 290/44 |
| 2010/0254059 A1 * | 10/2010 | Higuchi et al. ............... 361/103 |
| 2010/0259242 A1 * | 10/2010 | Gale et al. ..................... 323/318 |
| 2010/0327584 A1 * | 12/2010 | Fortmann ........................ 290/44 |
| 2010/0332045 A1 * | 12/2010 | Larsen .......................... 700/292 |

FOREIGN PATENT DOCUMENTS

| | | |
|---|---|---|
| JP | 2009226984 A * | 10/2009 |
| WO | 03030329 A1 | 4/2003 |
| WO | WO 2005015012 A1 * | 2/2005 |

* cited by examiner

REGULATION OF GENERATING PLANT

BACKGROUND OF THE INVENTION

The subject matter disclosed herein relates generally to electric generating plants and more specifically to regulating the output of electric generating plants in response to the temperature of transmission equipment connected to the generating plant.

BRIEF DESCRIPTION OF THE INVENTION

A method and system are disclosed that enable the regulation of the temperature of transmission equipment connected to a generating plant. In one embodiment, a method includes obtaining a temperature of transmission equipment connected to a generating plant and regulating the output of the generating plant in response to the temperature exceeding a threshold level to reduce the temperature of the transmission equipment to below the threshold level.

A first aspect of the invention provides a method comprising: obtaining a temperature of transmission equipment connected to a generating plant and regulating the generating plant in response to the temperature exceeding a threshold level to reduce the temperature of the transmission equipment to below the threshold level.

A second aspect of the invention provides a system comprising: a data obtainer that obtains a temperature of transmission equipment connected to a generating plant and a regulator that regulates the generating plant in response to the temperature of the transmission equipment exceeding the threshold level to reduce the temperature of the transmission equipment to below the threshold level.

BRIEF DESCRIPTION OF THE DRAWINGS

These and other features of this invention will be more readily understood from the following detailed description of the various aspects of the invention taken in conjunction with the accompanying drawings that depict various aspects of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a method and system for the regulation of the temperature of transmission equipment connected to a generating plant. In operating a generating plant, it is advantageous to have the generating plant operate at an output that will have the temperature of transmission equipment connected to the generating plant not exceed a threshold level. The transmission equipment will have a threshold level as determined by its manufacturer, owner or operator. Additionally, there may be environmental conditions that contribute to determining the threshold level of the transmission equipment. As an example, environmental conditions may include: air temperature, humidity, time-of-day (e.g., presence or absence of sunlight and duration until sunset) and prior weather conditions (e.g., recent rainstorms, prolong heat events, etc.). The threshold level may be, for example, the temperature at which the transmission equipment will fail if the temperature exceeds this level for a defined period of time. Additionally, the threshold level may be a temperature at which performance of the transmission equipment begins to deteriorate or permanent damage begins to occur. Other criteria may also be applied.

In operating a generating plant, a variety of factors may cause the temperature of the transmission equipment connected to the generating plant to exceed its threshold level. When the transmission equipment's temperature exceeds its threshold level, the output of the generating plant may be decreased to allow for a reduction in the temperature of the transmission equipment to below its threshold level. It is advantageous to the operation and maintenance of the generating plant and transmission equipment to have the ability to continually monitor the temperature of the transmission equipment connected to the generating plant and have the ability to regulate, and if necessary, reduce the generating plant's output if the temperature of the transmission equipment exceeds a threshold level. Furthermore, as discussed herein, it is beneficial to automate the regulation of the generating plant based on continual monitoring of the temperature of the transmission equipment.

Figure 1:
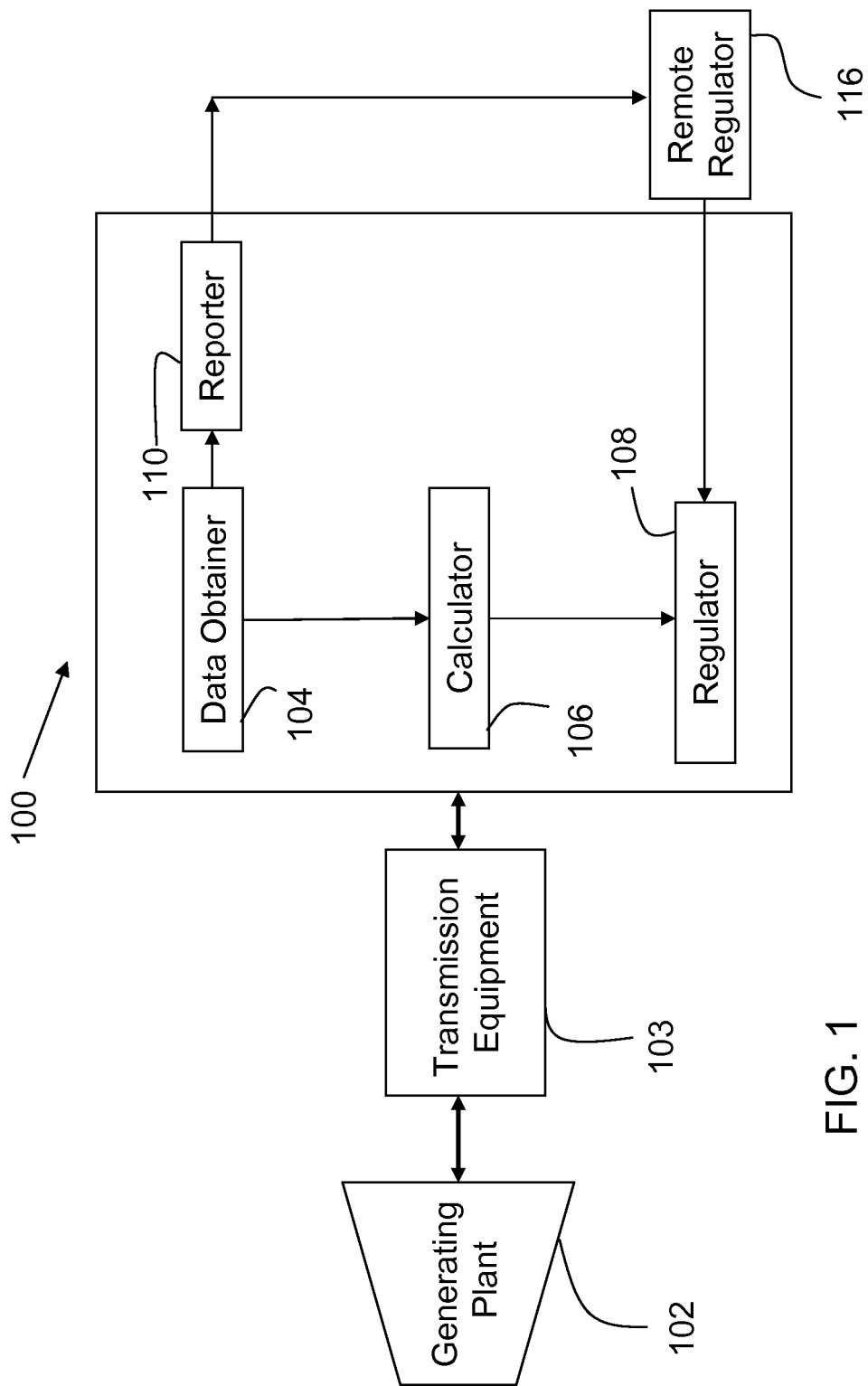
FIG. 1 shows a block diagram of an illustrative environment for implementing embodiments of a system according to the invention.

Turning to the drawings, FIG. 1 shows an illustration of the structures that comprise regulation mechanism 100. There is a generating plant 102 and transmission equipment 103 that connects to regulation mechanism 100. Generating plant 102 can be comprised of any facility that produces electricity. As an example, generating plant 102 can be a renewable electric generating plant such as wind, hydroelectric or solar. Furthermore, generating plant 102 can be a fossil-fuel based facility that operates on natural-gas, coal or oil. Moreover, generating plant 102 can include a single generator (e.g., wind turbine) or multiple generating plants (e.g., wind farm) where multiple single generators are interconnected. Transmission equipment 103 refers to electric lines and associated equipment (e.g., transformers, circuit breakers, network protectors, etc.) used to interconnect generating plant 102 with the destination for the electricity generated by generating plant 102 (e.g., end-use customer, high-voltage transmission line or network delivery system). Regulation mechanism 100 contains a data obtainer 104 that obtains the temperature of transmission equipment 103. Regulation mechanism 100 also includes a calculator 106. Calculator 106 calculates the difference in the temperature of transmission equipment 103 to a threshold level. Regulator 108 regulates the output of generating plant 102, if necessary, to reduce the output of generating plant 102 to have the temperature of transmission equipment 103 be below its threshold level.

Regulation mechanism 100 also includes a reporter 110. Reporter 110 may transmit information from data obtainer 104 to remote regulator 116. Regulation mechanism 100 also has remote regulator 116. Remote regulator 116 is able to remotely control regulator 108. Remote regulator 116 may be located at any location other than where regulation mechanism 100 is located.

In one embodiment, data obtainer 104 obtains the temperature of transmission equipment 103 connected to generating plant 102 and regulator 108 regulates generating plant 102 in response to the temperature of transmission equipment 103 exceeding the threshold level to reduce the temperature of transmission equipment 103 to below the threshold level. The temperature of transmission equipment 103 may be obtained by data obtainer 104 which may include a wired or wireless communication with, for example, a thermocouple on transmission equipment 103. Once the temperature of transmission equipment 103 is obtained by data obtainer 104, it may be continually reported to regulator 108. That is, data obtainer 104 may provide a constant flow of data on the temperature of transmission equipment 103 to regulator 108. Additionally, data obtainer 104 may be adjusted to provide the temperature of transmission equipment 103 at defined intervals (e.g., every 15-minutes, 1-hour, etc.) to regulator 108.

Regulation mechanism 100 and regulator 108 may operate automatically to adjust the output of generating plant 102. By using information continually supplied by data obtainer 104 regarding the temperature of transmission equipment 103, regulator 108 may automatically adjust the output of generating plant 102. Regulator 108 may regulate the output of generating plant 102 by decreasing the amount of reactive power generating plant 102 produces. Alternatively, regulator 108 may regulate (i.e., reduce) the fuel supplied to operate generating plant 102, thus resulting in a reduction in its real power output. Moreover, regulator 108 may direct electricity from transmission equipment 103 to another location (e.g., high-voltage transmission line, use as station power at generating plant 102, energy storage device, etc.) The automatic adjustment of the output of generating plant 102 may be based on the continuous obtaining of the temperature of transmission equipment 103 connected to generating plant 102.

It is understood that regulation mechanism 100 may be implemented as any type of computing infrastructure. Access to regulation mechanism 100 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, communication could occur in a client-server or server-server environment.

Figure 2:
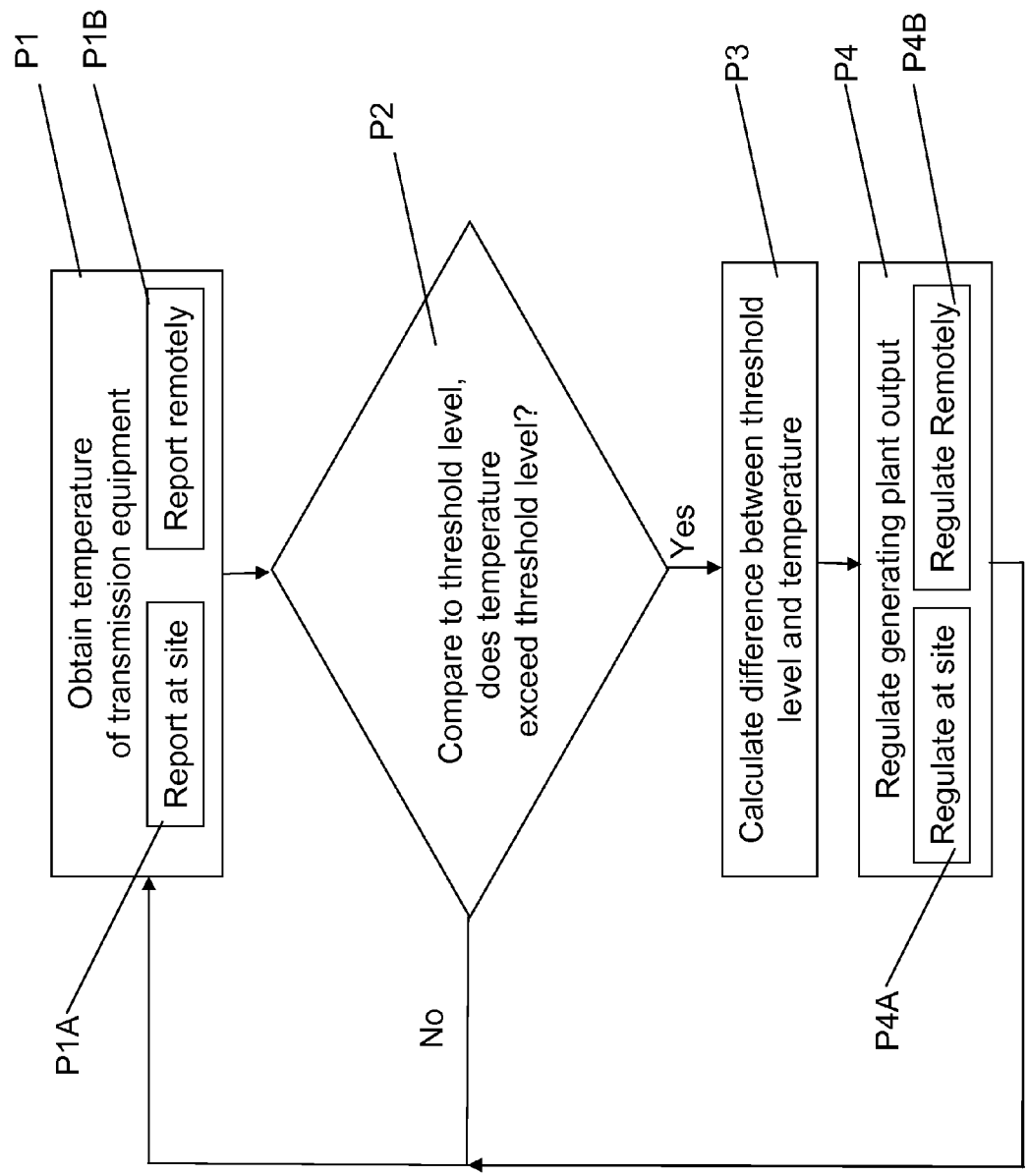
FIG. 2 shows a flow diagram of embodiments of a method of using the system of FIG. 1.

Turning to FIG. 2, and with continuing reference to FIG. 1, a flow diagram illustrating one embodiment of the process of regulation mechanism 100 is shown. In process P1, data obtainer 104 obtains the temperature of transmission equipment 103 connected to generating plant 102. In one embodiment, in process P1A, the output of data analyzer 104 can be reported at the same location as generating plant 102 and transmission equipment 103. In another embodiment, process P1B, the output of data analyzer 104 can be reported remotely (i.e., any location other than where generating plant 102 and transmission equipment 103 is located). When the output of data obtainer 104 is reported to a remote location, reporter 110 communicates the data to remote regulator 116.

After obtaining the temperature of transmission equipment 103 from data obtainer 104, in process P2, calculator 106 then compares the temperature of transmission equipment 103 to a threshold level. Calculator 106 then determines if the temperature of transmission equipment 103, as determined by data obtainer 104, exceeds the threshold level. If the temperature of transmission equipment 103 does not exceed the threshold level (i.e., NO at process P2), then data obtainer 104 repeats the obtaining of the temperature of transmission equipment 103 in process P1. If the temperature exceeds the threshold level (i.e., YES at P2), then calculator 106, in process P3, may calculate the difference between the temperature of transmission equipment 103 and the threshold level.

In process P4, regulator 108 regulates generating plant 102 to reduce the temperature of the transmission equipment to below the threshold level. In one embodiment, the regulation may be based on the difference in temperature between transmission equipment 103 and the threshold level as determined by calculator 106. Regulator 108 may reduce the output of generating plant 102 using any of the methods discussed herein. In another embodiment, regulator 108 may base the regulation on other factor(s) than the difference in temperature. The reduction of the output of generating plant 102 will result in a reduced temperature of transmission equipment 103. Regulator 108 may regulate generating plant 102 at the site of generating plant 102, process P4A. In another embodiment, remote regulator 116 may regulate generating plant 102 at any site other than where generating plant 102 is located, process P4B.

It should be appreciated that the teachings of the present invention could be offered on a subscription or fee basis. For example, a regulation mechanism 100 including data obtainer 104 and regulator 108 could be created, maintained and/or deployed by a service provider that offers the functions described herein for customers. That is, a service provider could offer to deploy or provide a regulation mechanism 100 as described above.

It is understood that in addition to being implemented as a system and method, the features may be provided as a program product stored on a computer-readable medium, which when executed, enables regulation mechanism 100 to provide regulation of generating plant 102. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic input/output ("I/O") system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for regulating a generating plant, the method comprising:
    obtaining a temperature of transmission equipment connected to the generating plant, the transmission equipment being physically external to a housing of the generating plant;
    continually obtaining the temperature of the transmission equipment and reporting the temperature of the transmission equipment to a regulator; and
    regulating the generating plant with the regulator in response to the temperature of the transmission equipment exceeding a threshold level,
    wherein the regulating includes adjusting the generating plant to reduce an output of the generating plant that causes a reduction of the temperature of the transmission equipment, the adjusting of the generating plant including adjusting a fuel supply to the generating plant, and
    wherein the regulating maintains a flow of output to the transmission equipment and reduces the temperature of the transmission equipment by adjusting operation of the generating plant across a range of outputs.

2. The method of claim 1, wherein the regulating includes providing a reduced flow of the output of the generating plant to the transmission equipment.

3. The method of claim 1, wherein the regulating of the generating plant is based on the reporting of the temperature of the transmission equipment to the regulator.

4. The method of claim 1, wherein the regulating includes directing a portion of the output of the generating plant away from the transmission equipment.

5. The method of claim 1, wherein the threshold level is based on at least one weather condition, and
    wherein the regulating includes decreasing the amount of reactive power generated.

6. The method of claim 1, further comprising:
    obtaining a temperature reading indicating the temperature of the transmission equipment using a thermocouple; and
    reporting the temperature of the transmission equipment to a remote location.

7. The method of claim 6, wherein the regulating includes regulating the output of the generating plant from the remote location.

8. A regulation system for a generating plant, the regulation system comprising:
    a data obtainer that obtains a temperature of transmission equipment connected to the generating plant, the transmission equipment being physically external to a housing of the generating plant; and
    a regulator that adjusts operation of the generating plant in response to the temperature of the transmission equipment exceeding a threshold level,
    wherein the regulator is configured to adjust the generating plant to reduce an output of the generating plant that causes a reduction of the temperature of the transmission equipment, the adjusting of the generating plant including adjusting a fuel supply to the generating plant, and
    wherein the adjusting operation of the generating plant maintains a flow of output to the transmission equipment and reduces the temperature of the transmission equipment.

9. The regulation system of claim 8, further comprising a calculator for calculating a difference between the temperature of the transmission equipment and a threshold level.

10. The regulation system of claim 8, wherein the data obtainer continuously obtains the temperature of the transmission equipment and reports the temperature of the transmission equipment to the regulator.

11. The regulation system of claim 8, wherein the regulator provides a reduced flow of output to the transmission equipment in response to the temperature of the transmission equipment exceeding a threshold level.

12. The regulation system of claim 10, wherein the regulator automatically adjusts operation of the generating plant based on the reports of the temperature of the transmission equipment, and
    wherein the adjustment includes decreasing the amount of reactive power generated.

13. The regulation system of claim 8, wherein the regulator directs a portion of the output of the generating plant away from the transmission equipment.

14. The regulation system of claim 8, wherein the threshold level is based on at least one weather condition and the regulator adjusts the fuel supply to the generating plant.

15. The regulation system of claim 8, further comprising a reporter for reporting the temperature of the transmission equipment to a remote location, wherein the temperature of the transmission equipment is obtained via a thermocouple connected to the transmission equipment.

16. The regulation system of claim 15, wherein a remote regulator regulates the output of the generating plant from the remote location.

17. A system for regulating operation of a generating plant, the system comprising:
    a data obtainer communicatively connected to transmission equipment connected to the generating plant, the transmission equipment being physically external to a housing of the generating plant; and
    a regulator communicatively connected to the data obtainer, the regulator adapted to regulate operation of the generating plant by performing actions including:
        obtaining a temperature of the transmission equipment from the data obtainer; and
        adjusting operation of the generating plant in response to determining the temperature of the transmission equipment exceeds a threshold level,
        wherein the adjusting includes decreasing the amount of reactive power generated and adjusting a fuel supply to the generating plant, the adjusting causing a reduction of the temperature of the transmission equipment, wherein the adjusting further includes maintaining a flow of output to the transmission equipment and reducing the temperature of the transmission equipment.

* * * * *